(12) United States Patent
Sun et al.

(10) Patent No.: US 9,178,624 B2
(45) Date of Patent: Nov. 3, 2015

(54) ACCURATE CALCULATION OF POLARIZATION MODE DISPERSION USING BLIND EQUALIZATION

(71) Applicant: Infinera Corporation, Sunnyvale (CA)

(72) Inventors: Han H. Sun, Ottawa (CA); Kuang-Tsan Wu, Ottawa (CA); Ahmed Awadalla, Gatineau (CA); John D. Mcnicol, Ottawa (CA)

(73) Assignee: Infinera Corporation, Sunnyvale, CA (US)

( * ) Notice: Subject to any disclaimer, the term of this patent is extended or adjusted under 35 U.S.C. 154(b) by 30 days.

(21) Appl. No.: 14/231,345

(22) Filed: Mar. 31, 2014

(65) Prior Publication Data

US 2015/0280833 A1  Oct. 1, 2015

(51) Int. Cl.
*H04B 10/61* (2013.01)

(52) U.S. Cl.
CPC ........ *H04B 10/6161* (2013.01); *H04B 10/6162* (2013.01)

(58) Field of Classification Search
CPC ........... H04B 10/6161; H04B 10/6162; H04B 10/6165; H04B 10/6166
USPC .................................................. 398/208, 209
See application file for complete search history.

(56) References Cited

U.S. PATENT DOCUMENTS

| | | | |
|---|---|---|---|
| 8,335,440 B2 | 12/2012 | Krause et al. | |
| 8,693,897 B2 * | 4/2014 | Mo et al. | 398/208 |
| 8,761,609 B1 * | 6/2014 | Agazzi et al. | 398/155 |
| 2005/0196176 A1 * | 9/2005 | Sun et al. | 398/152 |
| 2010/0074632 A1 * | 3/2010 | Zhou | 398/208 |
| 2011/0206385 A1 * | 8/2011 | Chen et al. | 398/208 |

OTHER PUBLICATIONS

Brian J. Soller, "Second-Order PMD in Optical Components", http://lunainc.com/wp-content/uploads/2012/08/2nd-Order-PMD.pdf, May 13, 2005, 6 pages.
Dominique N. Godard, "Self-Recovering Equalization and Carrier Tracking in Two-Dimensional Data Communication Systems", IEEE Transactions on Communications, vol. Com-28, No. 11, Nov. 1980 pp. 1867-1875.
J.C. Geyer et al., "Optical Performance Monitoring using a 43 Gb/s Realtime Coherent Receiver (Invited)", Summer Topical Meeting, 2009., LEOSST '09. IEEE/LEOS, Jul. 20-22, 2009, pp. 93-94.

(Continued)

*Primary Examiner* — Dalzid Singh
(74) *Attorney, Agent, or Firm* — Harrity & Harrity LLP; David L. Soltz

(57) ABSTRACT

A digital signal processor (DSP) may receive a signal that has an x-polarization (x-pol) and a y-polarization (y-pol). The DSP may equalize the x-pol of the signal and the y-pol of the signal based on filter coefficients determined using a constant modulus algorithm (CMA). The DSP may perform phase correction on the equalized x-pol signal and the equalized y-pol signal. The DSP may identify a first frame header pattern within the phase-corrected x-pol signal, and may identify a second frame header pattern within the phase-corrected y-pol signal. The DSP may determine, based on the first frame header pattern and the second frame header pattern, a quantity of lock-in differential group delay (DGD). The device may adjust one or more of the filter coefficients to remove the quantity of lock-in DGD and to permit an amount of polarization mode dispersion to be determined based on the filter coefficients.

20 Claims, 9 Drawing Sheets

(56) References Cited

OTHER PUBLICATIONS

F.N. Hauske et al., "DGD Estimation from FIR Filter Taps in Presence of Higher Order PMD", 34$^{th}$ European Conference on Optical Communication, 2008., Brussels Belgium, Sep. 21-24, 2008, 2 pages.

B. Huttner et al., "Polarization-Induced Distortions in Optical Fiber Networks with Polarization-Mode Dispersion and Polarization-Dependent Losses", IEEE Journal of Selected Topics in Quantum Electronics, vol. 6, No. 2, Mar./Apr. 2000, pp. 317-329.

F.N. Hauske et al., "Optical Performance Monitoring in Digital Coherent Receivers", Journal of Lightwave Technology, vol. 27, No. 16, Aug. 15, 2009, pp. 3623-3631.

Bogdan Szafraniec, "Performance Monitoring and Measurement Techniques for Coherent Systems", Optical Fiber Communication Conference and Exposition, 2012 and the National Fiber Optic Engineers Conference, Mar. 4-8, 2012, 29 pages.

* cited by examiner

000# ACCURATE CALCULATION OF POLARIZATION MODE DISPERSION USING BLIND EQUALIZATION

BACKGROUND

Optical communication systems are known in which optical signals carrying data are transmitted from a first node (e.g., a transmitter (Tx)) to a second node (e.g., a receiver (Rx)) via an optical fiber. At the Rx, the optical signal is converted into corresponding electrical signals, which are then further processed.

In some cases, the Rx may include a coherent Rx. In a coherent Rx, a received signal is mixed with an output of a local oscillator (LO) in an optical hybrid circuit, the outputs of which are provided to photodetectors to generate analog electrical output signals. For example, the analog signals may be sampled at a sample rate by analog-to-digital converter (ADC) circuits configured to supply outputs for further processing by a digital signal processor (DSP) included in the coherent Rx. Thus, for the coherent Rx, the amplitude, phase, and state of polarization of the optical signal are all transferred to the electrical domain for digital signal processing in the Rx DSP component.

While travelling through the fiber (e.g., from the Tx to the Rx), the optical signal may be subject to impairments such as chromatic dispersion (CD), polarization mode dispersion (PMD), etc. CD may be caused by various frequency components in each signal traveling at different velocities. PMD may be caused by various polarization components in each signal traveling at different velocities. As a result of such impairments, the in-phase component and quadrature component of electronic signals, representative of data carried by the optical signal, may have different delay, frequency response, and polarization characteristics. PMD and CD compensation may be achieved electronically using an equalizer in the receiver.

For example, the equalizer may be a finite-impulse response (FIR) digital filter. Such filters include taps, where symbols, associated with the signal, are transferred from one tap to the next, multiplied by a coefficient at each tap, and the resulting products are summed. Typically, the coefficients are selected and/or modified based on parameters, such as estimates of CD, PMD, etc., where such estimates may be obtained by "training" the equalizer. One known method of training an equalizer is known as blind equalization. According to the blind equalization method, the equalizer may be trained based on measuring the actual received signal output from the equalizer. One known method of implementing blind equalization is use of a constant modulus algorithm (CMA). In accordance with CMA, filter coefficients are selected and modified through an iterative process, whereby a cost function (e.g., a function associated with an amplitude variation associated with the signal) is minimized.

SUMMARY

According to some possible implementations, a digital signal processor (DSP), included in an optical receiver, may be configured to: receive a signal that has an x-polarization (x-pol) and a y-polarization (y-pol); equalize the x-pol of the signal, based on a constant-modulus-algorithm (CMA), to create an equalized x-pol signal, where the x-pol of the signal may be equalized using a set of filter coefficients determined using the CMA; equalize the y-pol of the signal, based on the CMA, to create an equalized y-pol signal, where the y-pol of the signal may be equalized using the set of filter coefficients determined using the CMA; perform phase correction on the equalized x-pol signal to create a phase-corrected x-pol signal; perform phase correction on the equalized y-pol signal to create a phase-corrected y-pol signal; identify a first frame header pattern within the phase-corrected x-pol signal, where the first frame header pattern may be based on a first frame header; identify a second frame header pattern within the phase-corrected y-pol signal, where the second frame header pattern may be based on a second frame header, and where the second frame header may be different than the first frame header; determine, based on the first frame header pattern and the second frame header pattern, a quantity of lock-in differential group delay (DGD) between the phase-corrected x-pol signal and the phase-corrected y-pol signal; and adjust one or more filter coefficients, of the set of filter coefficients, based on the quantity of lock-in DGD, where the one or more filter coefficients may be adjusted to remove the quantity of lock-in DGD, and where the one or more filter coefficients may be adjusted to permit an amount of polarization mode dispersion to be correctly determined based on the set of filter coefficients.

According to some possible implementations, an optical receive, included in a system, may be configured to: receive a signal having a first component and a second component; perform equalization of the first component of the signal to create a first equalized signal, where the equalization of the first component of the signal may be based on a group of filter coefficients determined by a constant-modulus-algorithm (CMA); perform equalization of the second component of the signal to create a second equalized signal, where the equalization of the second component the signal being based on the group of filter coefficients determined by the CMA; perform phase correction of the first equalized signal to create a first phase-corrected signal; perform phase correction of the second equalized signal to create a second phase-corrected signal; detect a first frame header pattern within the first phase-corrected signal, where the first frame header pattern may include a first frame header; detect a second frame header pattern within the second phase-corrected signal, where the second frame header pattern may include a second frame header; compute, based on the first frame header pattern and the second frame header pattern, a quantity of lock-in differential group delay (DGD) between the first phase-corrected signal and the second phase-corrected signal; and modify at least one filter coefficient, of the group of filter coefficients, based on the quantity of lock-in DGD, where the at least one filter coefficient may be adjusted to remove the quantity of lock-in DGD, and where the at least one filter coefficient may be modified to permit an amount of polarization mode dispersion to be accurately determined based on the group of filter coefficients.

According to some possible implementations, a method may include: receiving, by a digital signal processor (DSP), a signal having a first component and a second component; equalizing, by the DSP, the first component of the signal to create a first equalized signal, where the first component of the signal may be equalized based on a first group of filter coefficients determined using a constant-modulus-algorithm (CMA); equalizing, by the DSP, the second component of the signal to create a second equalized signal, where the second component of the signal may be equalized based on a second group of filter coefficients determined using the CMA; performing, by the DSP, phase correction of the first equalized signal to create a first phase-corrected signal; performing, by the DSP, phase correction of the second equalized signal to create a second phase-corrected signal; identifying, by the DSP, a first header timing pattern included in the first phase-corrected signal, where the first header timing pattern may be based on a first frame header; identifying, by the DSP, a second header timing pattern included in the second phase-corrected signal, where the second header timing pattern being based on a second frame header, and where the second frame header being different than the first frame header; determining, by the DSP, information associated with lock-in differential group delay (DGD) between the first phase-corrected signal and the second phase-corrected signal, where the information associated with the lock-in DGD may be determined based on the first frame header pattern relative to the second frame header pattern, and where the information associated with the lock-in DGD may include a quantity of lock-in DGD and a direction associated with the lock-in DGD; and adjusting, by the DSP, at least one filter coefficient based on the information associated with the lock-in DGD, where the at least one filter coefficient may be included in the first group of filter coefficients or the second group of filter coefficients.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the disclosure.

Advancements associated with a coherent Rx (herein referred to as "Rx") and adaptive equalization (e.g., multiple-input and multiple-output (MIMO) adaptive equalization, etc.) have enabled capabilities that were not possible in earlier fiber optic transmission systems. For example, due to the ability of an Rx to generate signals that are linearly proportional to an optical field, optical field impairments, such as PMD and CD, may be compensated for by a DSP component included in the Rx (as described above). Furthermore, the amount of PMD can be determined by the Rx based on filter coefficients associated with an equalizer that is used to compensate for PMD. In fact, the amount of PMD can be monitored by the Rx while the Rx carries data, without disrupting or degrading the flow of the data.

However, an amount of PMD, determined by the Rx in the manner described above, may be inaccurate when using a blind equalization algorithm (e.g., such as a CMA) because using a CMA in the presence of significant amount of PMD in a fiber may lead to a phenomenon known as lock-in differential group delay (DGD). As described above, the objective of the CMA is to minimize the cost function. However, the CMA may determine that a cost function is minimized even if an output of the equalizer includes a delay introduced during an acquisition phase of taps included in the equalizer. This insensitivity to output delay means that, although the output signals may be equalized, the output signals can be delayed (e.g., up to an amount equal to a time span of the equalizer). This arbitrary output delay is known as lock-in DGD, may remain in the taps indefinitely, and may adversely affect the accuracy of a PMD calculation performed based on the filter coefficients. Lock-in DGD may be measured in units of symbol period (UI).

Furthermore, a decision-directed least mean squares (LMS) algorithm (e.g., implemented after convergence of the CMA algorithm) does not remove the effect of lock-in DGD. Implementations described herein may allow a receiver to identify an amount and direction of lock-in DGD such that the receiver may use filter coefficients, associated with an equalizer that implements a CMA, to accurately determine fiber PMD.

Figure 1:
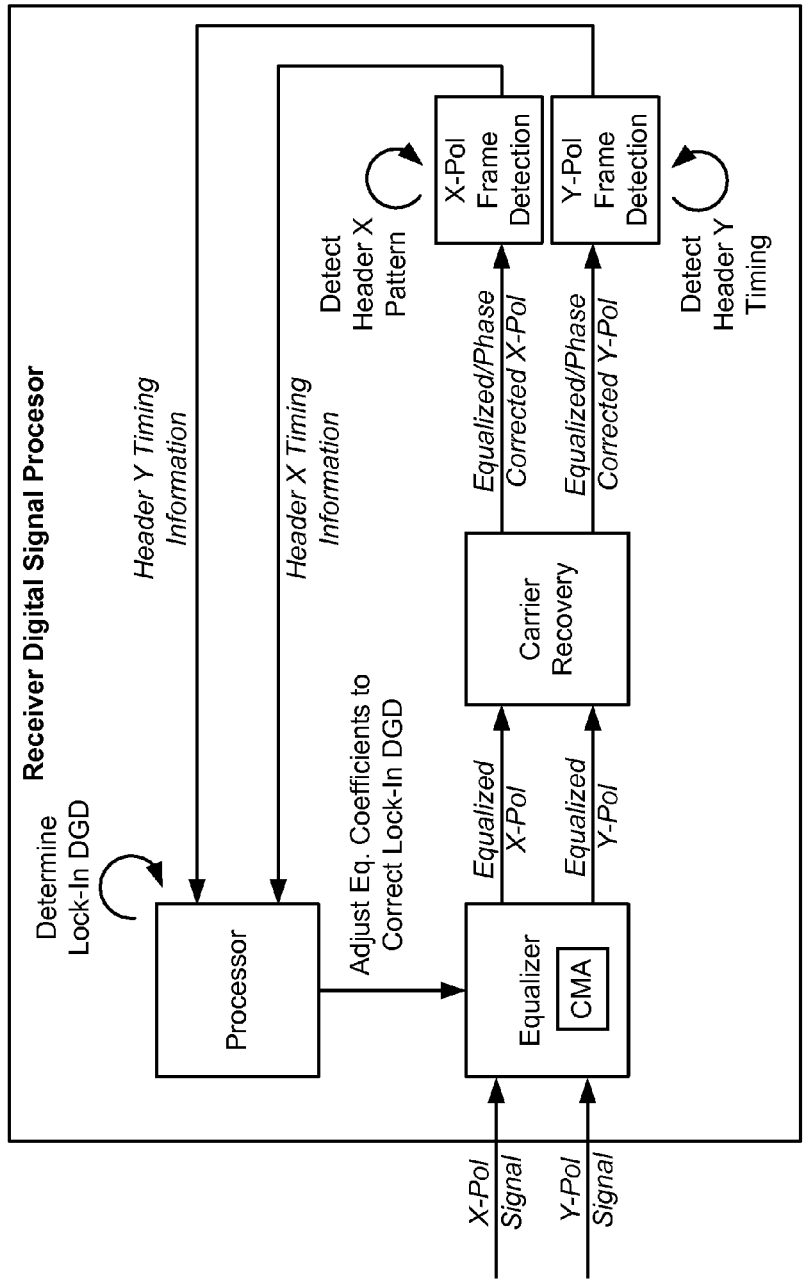
FIG. 1 is a diagram of an overview of an example implementation described herein.

FIG. 1 is a diagram of an overview of an example implementation 100 described herein. For the purposes of example implementation 100, assume that a DSP component of an Rx has received, from a set of analog-to-digital converters (ADCs) an x-polarization (x-pol) signal (e.g., including an in-phase x-pol component and a quadrature phase x-pol component) and a y-polarization (y-pol) signal (e.g., including an in-phase y-pol component and a quadrature phase y-pol component), associated with an input signal, that corresponds to an output signal provided by a Tx. Further, assume that data associated with each signal component is organized into frames, that a frame header associated with the x-pol signal components is a first frame header (e.g., Header X), and that a frame header associated with the y-pol signal components is a second frame header (e.g., Header Y). Also, assume that the Tx provided the output signal such that the frame headers (e.g., associated with each of the four signal components) were time aligned at the time of output.

As shown in FIG. 1, the x-pol and y-pol signals may be provided to an equalizer component, included in the Rx DSP component, that implements blind equalization using a CMA. As further shown, the equalizer component may equalize the x-pol signal and may equalize the y-pol signal, and may provide the equalized signals to a carrier recovery component. As further shown, the carrier recovery component may perform phase correction, may provide a phase-corrected x-pol signal to an x-pol frame detection component, and may provide a phase-corrected y-pol signal to a y-pol frame detection component.

As further shown, the x-pol frame detection component may detect a Header X timing pattern in the phase-corrected x-pol signal, and the y-pol frame detection component may detect a Header Y timing pattern in the phase-corrected y-pol signal. As shown, the x-pol frame detection component may provide Header X framing information (e.g., associated with the Header X timing pattern) to a processor, and the y-pol frame detection component may provide Header Y framing information (e.g., associated with the Header Y timing pattern) to the processor.

For purposes of example implementation 100, assume that the Header X framing information and the Header Y framing information indicate that the Header X and the Header Y frame headers are no longer time aligned, and that the processor determines that there exists 2 units of symbol period (UI) of DGD between the Header X timing pattern and the Header Y timing pattern. As such, the processor may determine that 2UI of lock-in DGD was introduced during the acquisition phase of equalizer taps associated with the CMA algorithm.

As further shown in FIG. 1, the processor may open a filter coefficient loop in the equalizer component associated with adapting the filter coefficients, and may adjust the filter coefficients to remove the 2UI of lock-in DGD. The processor may then close the filter coefficient loop, and the CMA, associated with the equalizer component, may continue to adapt the filter coefficients. The processor may then (e.g., periodically) determine the filter coefficients, as adapted by the CMA, and may calculate an accurate amount of PMD in the fiber channel based on the filter coefficients (e.g., since the lock-in DGD has been removed). In this way, a receiver digital signal processor may identify lock-in DGD and may cause the lock-in DGD to be removed such that accurate determination of fiber PMD, based on filter coefficients associated with an equalizer component that implements a CMA, is possible.

Figure 2:
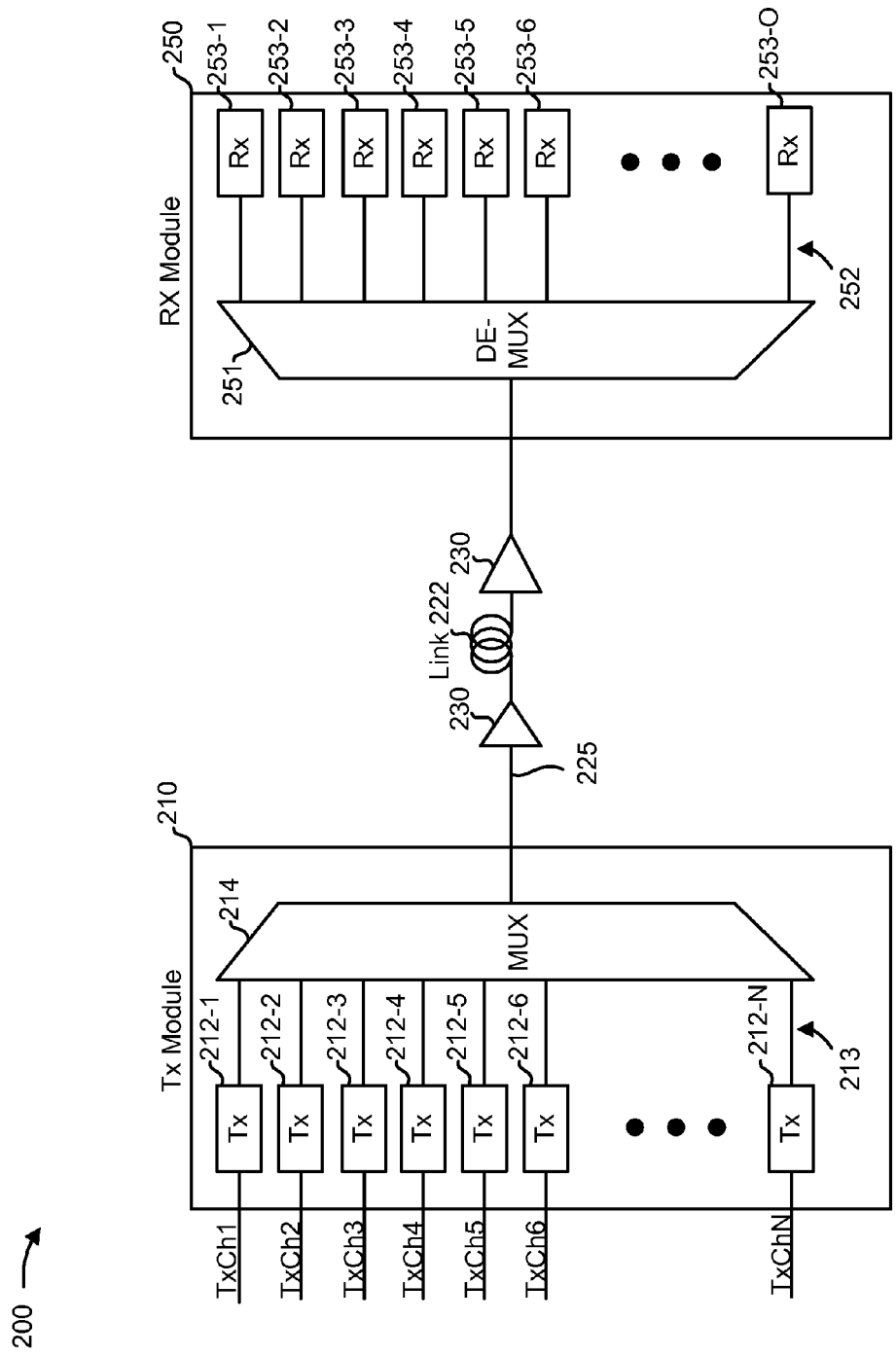
FIG. 2 is a diagram of an example network in which systems and/or methods, described herein, may be implemented.

FIG. 2 is a diagram of an example network 200 in which systems and/or methods described herein may be implemented. As shown in FIG. 2, a network may include transmitter module 210 (e.g., a Tx PIC) and/or receiver module 250 (e.g., an Rx PIC). In some implementations, transmitter module 210 may be optically connected to receiver module 250 via link 222, and/or optical amplifiers 230. Link 222 may include one or more optical amplifiers 230 that amplify an optical signal as the optical signal is transmitted over link 222.

Transmitter module 210 may include a number of optical transmitters 212-1 through 212-N (N>1), waveguides 213, and/or optical multiplexer 214. Each optical transmitter 212 may receive a data channel (TxCh1 through TxChN), modulate the data channel with an optical signal, and transmit the data channel as an optical signal. In some implementations, transmitter module 210 may include 5, 10, 20, 50, 100, or some other number of optical transmitters 212. Each optical transmitter 212 may be tuned to use an optical carrier of a designated wavelength. It may be desirable that the grid of wavelengths emitted by optical transmitters 212 conform to a known standard, such as a standard published by the Telecommunication Standardization Sector (ITU-T).

Waveguides 213 may include optical links to transmit modulated outputs (referred to as "signal channels") of optical transmitters 212. In some implementations, each optical transmitter 212 may connect to one waveguide 213 or to multiple waveguides 213 to transmit signal channels of optical transmitters 212 to optical multiplexer 214. In some implementations, waveguides 213 may be made from a birefringent material and/or some other material.

Optical multiplexer 214 may include an arrayed waveguide grating (AWG) or some other multiplexing device. In some implementations, optical multiplexer 214 may combine multiple signal channels, associated with optical transmitters 212, into a wave division multiplexed (WDM) signal, such as optical signal 225.

As further shown in FIG. 2, receiver module 250 may include optical demultiplexer 251, waveguides 252, and/or optical receivers 253-1 through 253-O (O>1). In some implementations, optical demultiplexer 251 may include an AWG or some other device. Optical demultiplexer 251 may supply multiple signal channels based on a received WDM signal (e.g., optical signal 225). As shown in FIG. 2A, optical demultiplexer 251 may supply signal channels to optical receivers 253 via waveguides 252.

Waveguides 252 may include optical links to transmit outputs of optical demultiplexer 251 to optical receivers 253. In some implementations, each optical receiver 253 may receive outputs via a single waveguide 252 or via multiple waveguides 252. In some implementations, waveguides 252 may be made from a birefringent material and/or some other kind of material.

Optical receivers 253 may each operate to convert an input optical signal to an electrical signal that represents the transmitted data. In some implementations, optical receivers 253 may each include one or more photodetectors and/or related devices to receive respective input optical signals outputted by optical demultiplexer 251 and a local oscillator, convert the signals to a photocurrent, and provide a voltage output to function as an electrical signal representation of the original input signal.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of network 200 may perform one or more functions described as being performed by another one or more of the devices of network 200.

Figure 3:
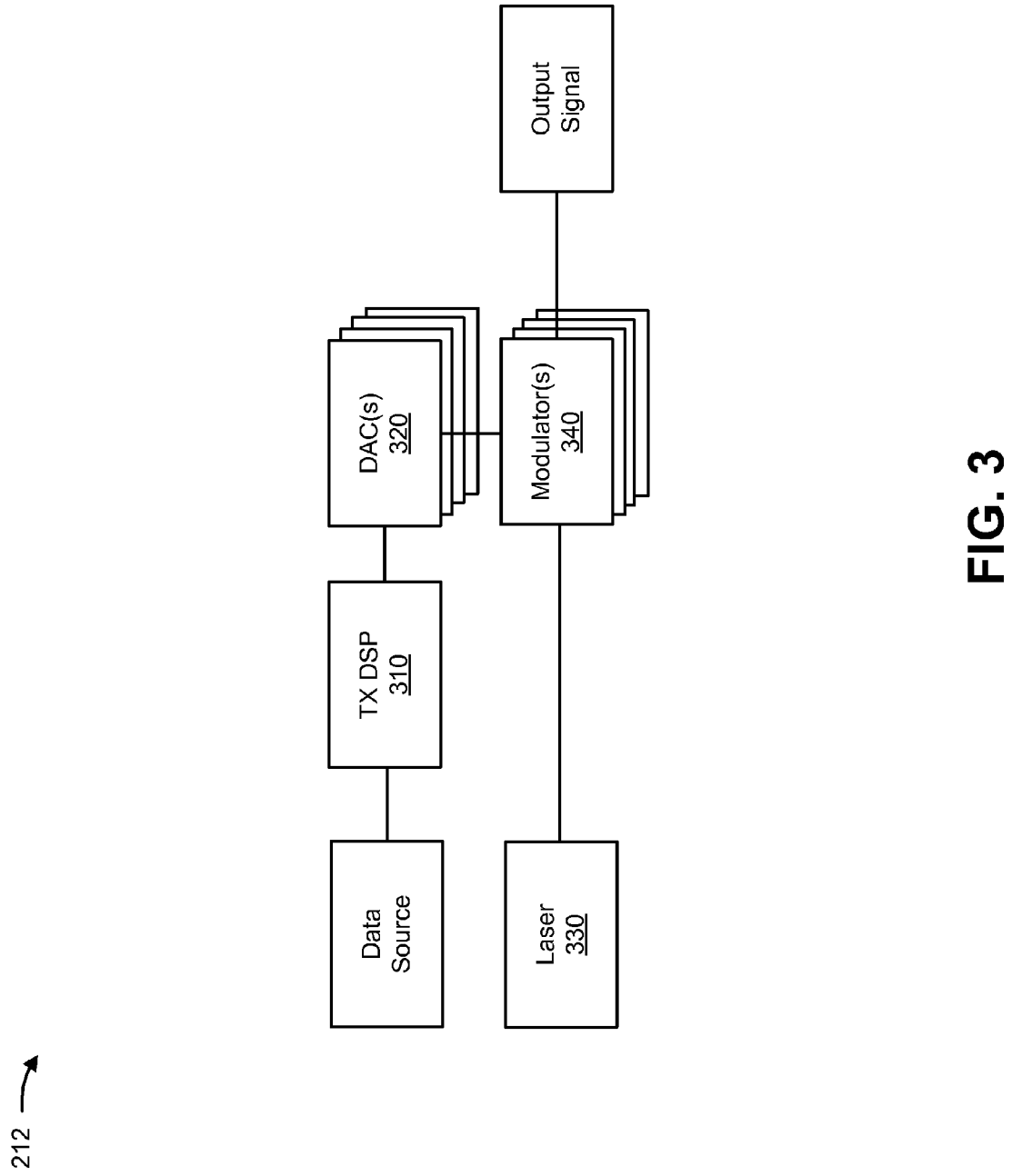
FIG. 3 is a diagram of example components of an optical transmitter shown in FIG. 2.

FIG. 3 is a diagram of example components of an optical transmitter 212 shown in network 200 of FIG. 2. As shown in FIG. 3, optical transmitter 212 may include a Tx DSP 310, one or more DACs 320, a laser 330, and one or more modulators 340. In some implementations, Tx DSP 310, DACs 320, laser 330, and/or modulators 340 may be implemented on one or more integrated circuits, such as one or more PICs, one or more application specific integrated circuits (ASICs), or the like. In some implementations, components of multiple optical transmitters 212 may be implemented on a single integrated circuit, such as a single PIC, to form a superchannel transmitter.

Tx DSP 310 may include a digital signal processor or a collection of digital signal processors. In some implementations, Tx DSP 310 may receive a data source (e.g., a signal received via a Tx channel), process the signal, and output digital signals having symbols that represent components of the signal (e.g., an in-phase x-pol component, a quadrature x-pol component, an in-phase y-pol component, and a quadrature y-pol component).

In some implementations, Tx DSP 310 may include a frame header insertion component configured to define a frame for grouped bits associated with the input data (e.g., a group of bits associated with the in-phase x-pol component, a group of bits associated with the quadrature x-pol component, a group of bits associated with the in-phase y-pol component, and a group of bits associated with the quadrature y-pol component). In some implementations, the frame header insertion component may insert a first frame header for frames of grouped bits associated with a first polarization (e.g., groups of bits associated with the x-pol components of the signal) and may insert a second frame header for frames of grouped bits associated with a second polarization (e.g., groups of bits associated with the y-pol components of the signal). In some implementations, the first frame header and the second frame header may be different. Alternatively, the first frame header and the second frame header may be identical. In some implementations, the first frame header and the second frame header may be used in optical receiver 253 for frame header pattern detection, as described below. In some implementations, Tx DSP 310 may apply spectral shaping and/or perform filtering to the signal.

DAC 320 may include a signal converting device or a collection of signal converting devices. In some implementations, DAC 320 may receive respective digital signals from Tx DSP 310, may convert the received digital signals to analog signals, and may provide the analog signals to modulator 340. The analog signals may correspond to electrical signals (e.g., voltage signals) to drive modulator 340. In some implementations, transmitter module 212 may include multiple DACs 320, where a particular DAC 320 may correspond to a particular polarization (e.g., an x-polarization, a y-polarization) of a signal and/or a particular component of a signal (e.g., an in-phase component, a quadrature component).

Laser 330 may include a semiconductor laser, such as a distributed feedback (DFB) laser, or some other type of laser. Laser 330 may provide an output optical light beam to modulator 340.

Modulator 340 may include a Mach-Zehnder modulator (MZM), such as a nested MZM, or another type of modulator. Modulator 340 may receive the optical light beam from laser 330 and the voltage signals from DAC 320, and may modulate the optical light beam, based on the voltage signals, to generate a multiple sub-carrier output signal, which may be provided to multiplexer 214.

In some implementations, optical transmitter 212 may include multiple modulators 340, which may be used to modulate signals of different polarizations. For example, an optical splitter may receive an optical light beam from laser 330, and may split the optical light beam into two branches: one for a first polarization (e.g., an x-polarization) and one for a second polarization (e.g., the y-polarization). The splitter may output one optical light beam to a first modulator 340, which may be used to modulate signals of the first polarization, and another optical light beam to a second modulator 340, which may be used to modulate signals of the second polarization. In some implementations, two DACs 320 may be associated with each polarization. In these implementations, two DACs 320 may supply voltage signals to the first modulator 340 (e.g., for an in-phase component of the x-polarization and a quadrature component of the x-polarization), and two DACs 320 may supply voltage signals to the second modulator 340 (e.g., for an in-phase component of the y-polarization and a quadrature component of the y-polarization). The outputs of modulators 340 may be combined back together using combiners (e.g., optical multiplexer 214) and polarization multiplexing.

The number and arrangement of components shown in FIG. 3 is provided as an example. In practice, optical transmitter 212 may include additional components, fewer components, different components, or differently arranged components than those shown in FIG. 3. For example, the quantity of DACs 320, lasers 330, and/or modulators 340 may be selected to implement an optical transmitter 212 that is capable of generating polarization diverse signals for transmission on an optical fiber, such as link 222. Additionally, or alternatively, a set of components shown in FIG. 3 may perform one or more functions described herein as being performed by another set of components shown in FIG. 3.

Figure 4:
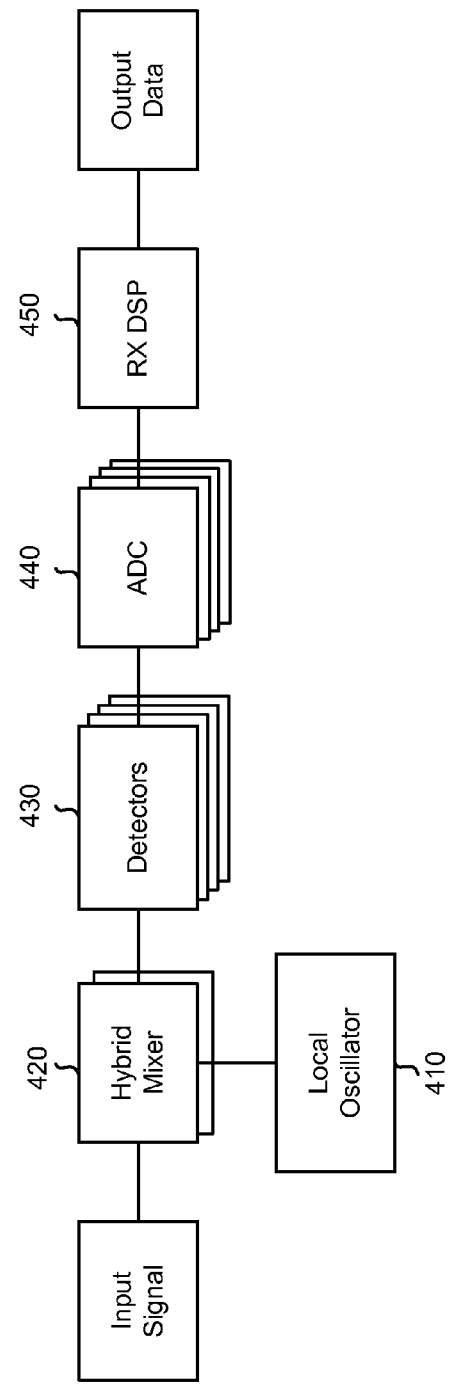
FIG. 4 is a diagram of example components of an optical receiver shown in FIG. 2.

FIG. 4 is a diagram of example components of an optical receiver 253 as shown in network 200 of FIG. 2. As shown in FIG. 4, optical receiver 253 may include local oscillator 410, hybrid mixer 420, detectors 430, analog-to-digital converters (ADCs) 440, and/or Rx DSP 450. In some implementations, local oscillator 410, hybrid mixer 420, and detectors 430 may be implemented on a single integrated circuit, such as a single PIC. In some implementations, ADC 440 and Rx DSP 450 may be implemented using an ASIC. In some other implementations, local oscillator 410, hybrid mixer 420, and/or detectors 430 may be implemented on one or more PICs.

Local oscillator 410 may include a laser device. In some implementations, local oscillator 410 may provide a reference signal to hybrid mixer 420. In some implementations, local oscillator 410 may include a single-sided laser to provide an optical signal to hybrid mixer 420. In some other implementations, local oscillator 410 may include a double-sided laser to provide multiple optical signals to multiple hybrid mixers 420. In some implementations, a phase, intensity, and/or amplitude of the reference signal may be compared to a phase, intensity, and/or amplitude of an input signal (e.g., a WDM signal supplied by optical demultiplexer 251 and corresponding to an output signal provided by transmitter module 210) to recover data carried by the input signal.

Hybrid mixer 420 may include one or more optical devices to receive an input signal (e.g., a WDM signal supplied by optical demultiplexer 251 and corresponding to an output signal provided by transmitter module 212). In some implementations, hybrid mixer 420 may receive a reference signal from local oscillator 410. In some implementations, hybrid mixer 420 may supply components associated with the input signal and the reference optical signal to detectors 430. For example, hybrid mixer 420 may supply an in-phase x-pol component, a quadrature x-pol component, an in-phase y-pol component, and a quadrature y-pol component. In some implementations, a first hybrid mixer 420 may provide the in-phase x-pol component and the quadrature x-pol component, and a second hybrid mixer 420 may provide the in-phase y-pol component and the quadrature y-pol component.

Detector 430 may include one or more photodetectors, such as a photodiode, to receive the output optical signal, from hybrid mixer 420, and convert the output optical signal to corresponding voltage signals. In some implementation, optical receiver 253 may include multiple detectors 430 for in-phase x-pol components, quadrature x-pol components, in-phase y-pol components, and quadrature y-pol components. In some implementations, detectors 430 may include one or more balanced pairs of photodetectors. For example, detectors 430 may include a first pair of photodetectors to receive an in-phase x-pol component, and a second pair of photodetectors to receive a quadrature x-pol component. Additionally, detectors 430 may include a third pair of photodetectors to receive an in-phase y-pol component, and a fourth pair of photodetectors to receive a quadrature y-pol component.

ADC 440 may include an analog-to-digital converter that converts the voltage signals from detector 430 to digital signals. ADC 440 may provide the digital signals to Rx DSP 450. In some implementations, optical receiver 253 may include four ADCs 440 or some other number of ADCs 440 (e.g., one ADC 440 for each electrical signal output by detectors 430).

Rx DSP 450 may include a digital signal processing device or a collection of digital signal processing devices. In some implementations, Rx DSP 450 may receive digital signals from ADCs 440 and may process the digital signals to form output data associated with the input signal received by hybrid mixer 420. In some implementations, Rx DSP 450 may detect an amount and a direction of lock-in DGD associated with a digital signal after the signal is equalized, and Rx DSP 450 may remove the lock-in DGD from the digital signal. Additional details regarding Rx DSP 450 are described with respect to FIG. 5.

While FIG. 4 shows optical receiver 253 as including a particular quantity and arrangement of components, in some implementations, optical receiver 253 may include additional components, fewer components, different components, or differently arranged components.

Figure 5:
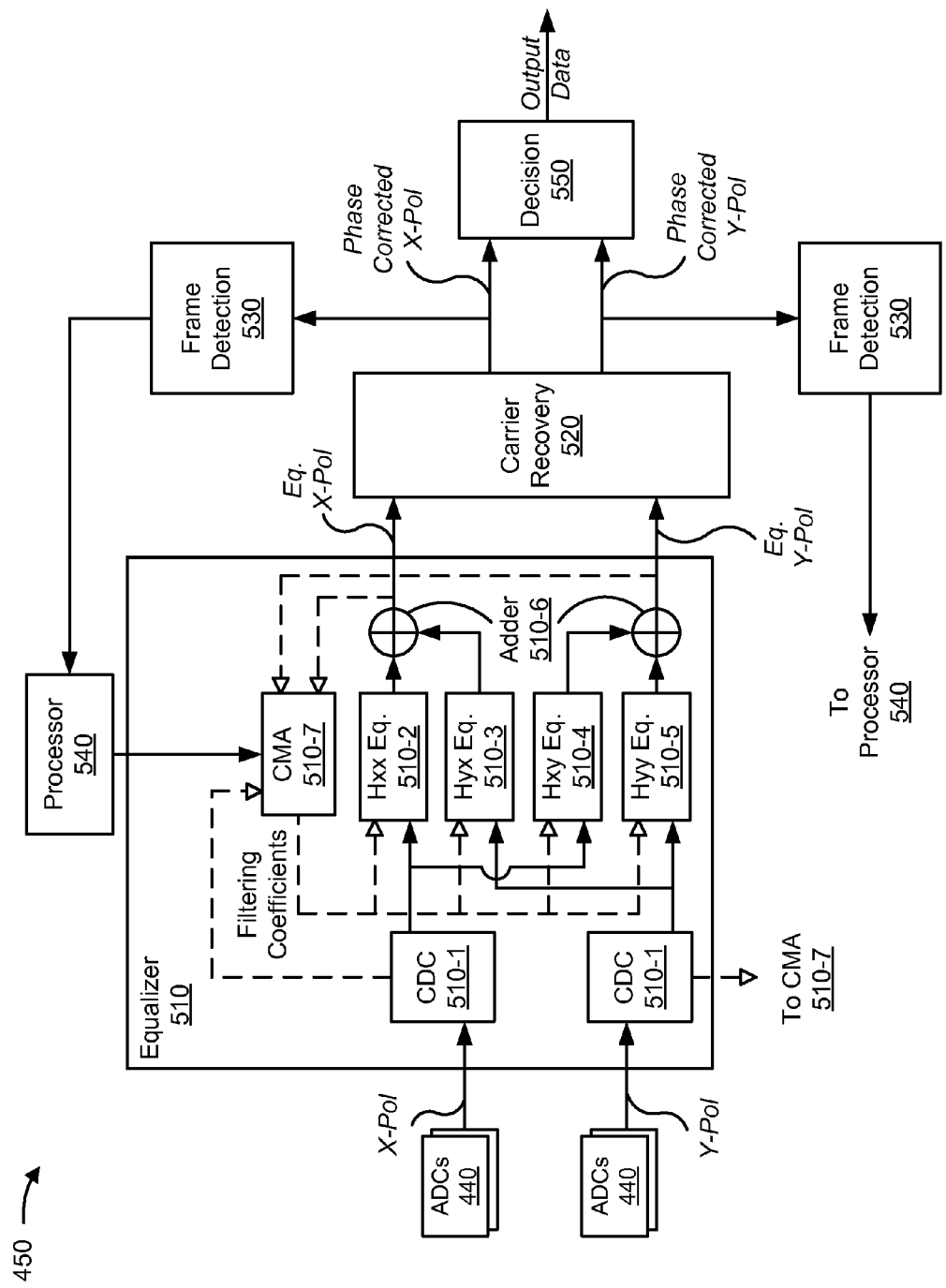
FIG. 5 is a diagram of example components of a receiver digital signal processor as shown in FIG. 4.

FIG. 5 is a diagram of example components of a Rx DSP 450 as shown in FIG. 4. As shown in FIG. 4, Rx DSP 450 may include an equalizer component 510, a carrier recovery component 520, frame detection components 530, a processor 540, and a decision component 550.

Equalizer component 510 may include one or more components to receive a signal, filter the signal to remove undesired impairments due to channel and/or hardware imperfection (e.g., PMD, CD, etc.), and provide an equalized signal. In some implementations, equalizer component 510 may receive a signal (e.g., an in-phase x-pol signal, a quadrature phase x-pol signal, an in-phase y-pol signal, a quadrature phase y-pol signal) from ADC 440, may equalize the signal, as discussed below, and may provide the equalized signal to carrier recovery component 520.

As shown in FIG. 5, equalizer component 510 may include chromatic dispersion compensators (CDC) 510-1, an Hxx equalizer 510-2, an Hyx equalizer 510-3, an Hxy equalizer 510-4, an Hyy equalizer 510-5, adders 510-6, and a constant modulus algorithm (CMA) component 510-7.

CDC 510-1 may include a component design to compensate for CD. For example, a first CDC 510-1 may be configured to receive (e.g., from ADCs 440) an x-pol signal (e.g., including an in-phase x-pol component and a quadrature x-pol component), and the first CDC 510-1 may compensate for CD in the x-pol signal. Similarly, a second CDC 510-1 may be configured to receive a y-pol signal (e.g., including an in-phase y-pol component and a quadrature y-pol component), and the second CDC 510-1 may compensate for CD in the y-pol signal. In this example, the first CDC 510-1 may provide the x-pol signal to Hxx equalizer 510-2 and Hxy equalizer 510-4, and the second CDC 510-1 may provide the y-pol signal to Hyx equalizer 510-3 and Hyy equalizer 510-5. The first CDC 510-1 may also provide the x-pol signal to CMA 510-7 and the second CDC 510-1 may also provide the y-pol signal to CMA 510-7 (e.g., such that CMA 510-7 may adapt the filter coefficients based on the x-pol signal and the y-pol signal provided by the first CDC 510-1 and the second CDC 510-1, respectively).

Hxx equalizer 510-2, Hyx equalizer 510-3, Hxy equalizer 510-4, Hyy equalizer 510-5, adders 510-6, and CMA component 510-7 may include a group components configured to compensate for PMD, associated with a signal, by equalizing the signal. For example, Hxx equalizer 510-2 may receive the x-pol signal from a first CDC 510-1, may filter the x-pol signal, and may output a first filtered x-pol signal. Similarly, Hyx equalizer 510-3 may receive the y-pol signal from a second CDC 510-1, may filter the y-pol signal, and may output a second filtered x-pol signal. The outputs of Hxx equalizer 510-2 and Hyx equalizer 510-3 may be provided to a first adder 510-6 configured to sum the first filtered x-pol signal and the second filtered x-pol signal to form an equalized x-pol signal.

In some implementations, CDC 510-1 may be implemented in the frequency domain (e.g. using fast Fourier transform (FFT), inverse FFT, overlap-save, etc.), and Hxx equalizer 510-2, Hyx equalizer 510-3, Hxy equalizer 510-4, and Hyy equalizer 510-5 may be implemented in the time domain (e.g., as FIR tap-delay-line filters). Additionally, or alternatively, CDC 510-1, Hxx equalizer 510-2, Hyx equalizer 510-3, Hxy equalizer 510-4, and Hyy equalizer 510-5 may all be implemented in the frequency domain.

Continuing this example, Hxy equalizer 510-4 may receive the x-pol signal from the first CDC 510-1, may filter the x-pol signal, and may output a first filtered y-pol signal. Similarly, Hyy equalizer 510-5 may receive the y-pol signal from the second CDC 510-1, may filter the y-pol signal, and may output a second filtered y-pol signal. The outputs of Hxy equalizer 510-4 and Hyy equalizer 510-5 may be provided to a second adder 510-6 configured to sum the first filtered y-pol signal and the second filtered y-pol signal to form an equalized y-pol signal. In some implementations, Hxx equalizer 510-2, Hyx 510-3, Hxy 510-4, and Hyy equalizer 510-5 may filter the x-pol signal and the y-pol signal based on filter coefficients, determined by CMA component 510-7, used to equalize the x-pol signal and the y-pol signal. In some implementations, the equalized x-pol signal and the equalized y-pol signal may be provided to carrier recovery component 520 by adders 510-6.

CMA component 510-7 may include a component configured to determine, update, modify, adjust, and/or provide filter coefficients (e.g., an Hxx filter coefficient, an Hyx filter coefficient, an Hxy filter coefficient, an Hyy filter coefficient) to be used by Hxx equalizer 510-2, Hyx equalizer 510-3, Hxy equalizer 510-4, and Hyy equalizer 510-5 to equalize the x-pol signal and the y-pol signal. In some implementations, the filter coefficients may be initially established and may converge towards a particular value as the signals are provided and processed through Rx DSP 450. In some implementations, CMA component 510-7 may dynamically adapt the filter coefficients in order to minimize a cost function (e.g., an amplitude variation associated with the signal).

However, CMA component 510-7 may ignore an output delay when minimizing the cost function. As such, although the x-pol signal and the y-pol signal may be equalized, the signals may be delayed by a time span associated with an equalizer (e.g., Hxx equalizer 510-2, Hyx equalizer 510-3, Hxy equalizer 510-4, or Hyy equalizer 510-5 included in equalizer component 510). This output delay may adversely affect the accuracy of an amount of PMD calculated based on the filter coefficients.

In some implementations, the filter coefficients may be accessed by firmware, the firmware may calculate an amount of PMD associated with the fiber channel based on the filter coefficients, and information associated with the amount of PMD may be provided to a user.

Carrier recovery component 520 may receive a signal (e.g., an equalized signal provided by equalizer component 510) and may perform phase correction to remove phase noise from the signal (e.g., phase noise associated with a Tx laser and/or an Rx laser, such as local oscillator 410). In some implementations, carrier recovery component 520 may operate in different modulation modes (e.g., QPSK modulation mode, a 16QAM modulation mode, etc.).

In some implementations, carrier recovery component 520 may receive an equalized signal (e.g., an equalized x-pol signal, an equalized y-pol signal) from equalizer component 510, may correct a phase associated with the equalized signal, and may output a phase-corrected signal (e.g., a phase-corrected x-pol signal, a phase-corrected y-pol signal) to frame detection component 530 and/or decision component 550.

Frame detection component 530 may receive a phase-corrected signal (e.g., a phase-corrected x-pol signal, a phase-corrected y-pol signal) from carrier recovery component 520. Frame detection component 530 may include a component configured to detect a frame header pattern included in the phase-corrected signal. For example, a first frame detection component 530, associated with an in-phase component of an x-pol signal, may be configured to detect a first frame header pattern associated with a known x-pol frame header (e.g., when the x-pol frame header was inserted in a corresponding in-phase component of the x-pol signal by the frame header insertion component included in Tx DSP 310). Similarly, a second frame detection component 530, associated with an in-phase component of a y-pol signal, may be configured to detect a second frame header pattern associated with a known y-pol frame header (e.g., when the y-pol frame header was inserted in a corresponding in-phase component of the y-pol signal by the frame header insertion component included in Tx DSP 310).

In some implementations, frame detection component 530 may be configured such that frame detection component 530 is robust to 90 degree cycle slips. For example, a frame header (e.g., inserted by the frame header insertion component), associated with the in-phase component of the x-pol signal, may be identical to a frame header associated with the quadrature component of the x-pol signal. In this example, if frame detection component 530 is configured to detect the frame header pattern, associated with the frame header, in a data path associated with the in-phase component of the x-pol signal, frame detection component 530 may still detect the frame header in the event of a 90 degree cycle slip that causes the quadrature component of the x-pol signal to be provided to frame detection component 530 (e.g., since the frame headers are identical).

Additionally, or alternatively, frame detection component 530 may be configured such that frame detection component 530 is robust to 90 degree and 180 degree phase slips. For example, a frame detection component 530 associated with an in-phase component of an x-pol signal may be configured to detect a frame header pattern and the inverse of the frame header pattern.

Additionally, or alternatively, frame detection component 530 may be configured to detect a frame header pattern associated with both an x-pol signal and a y-pol signal. For example, a frame detection component 530 associated with an in-phase component of an x-pol signal may be configured to detect a frame header pattern (and the inverse of the frame header pattern) associated with an in-phase component of a y-pol signal (e.g., since the frame header pattern associated with the in-phase component of the y-pol signal may appear in the x-pol data stream). Similarly, a frame detection component 530 associated with the in-phase component of the y-pol signal may be configured to detect a frame header pattern (and the inverse of the frame header pattern) associated with the in-phase component of the x-pol signal (e.g., since the frame header pattern associated with the in-phase component of the x-pol signal may appear in the y-pol data stream). In some implementations, a frame header pattern associated with an x-pol signal may be different than a frame header pattern associated with a y-pol signal. Alternatively, the frame header pattern associated with the x-pol signal may be identical to the frame header pattern associated with the y-pol signal.

In some implementations, frame detection components 530 may determine, based on detecting the frame header patterns in the x-pol signal and the y-pol signal, framing information that indicates a relative delay between the x-pol signal and the y-pol signal after the signal has been equalized by equalizer component 510 and phase-corrected by carrier recovery component 520 (e.g., the relative delay may be indicative of the amount and direction of lock-in DGD between the phase-corrected x-pol signal and the phase-corrected y-pol signal). In some implementations, frame detection component 530 may provide the framing information (e.g., x-pol framing information, y-pol framing information) to processor 540.

Processor 540 may receive framing information from frame detection components 530, and may determine an amount and/or a direction of lock-in DGD based on the framing information. For example, processor 540 may determine the amount and direction of lock-in DGD based on determining that the x-pol signal has been advanced or delayed by a first quantity of symbols and/or based on determining that the y-pol signal has been advanced or delayed by a second quantity of symbols. Processor 540 may then open a filter coefficient loop (e.g., a loop between Hxx equalizer 510-2, Hyx 510-3, Hxy 510-4, Hyy equalizer 510-5, and CMA component 510-7), associated with adapting the filter coefficients (e.g., the Hxx filter coefficient, the Hyx filter coefficient, the Hxy filter coefficient, and the Hyy filter coefficient) such that CMA component 510-7 is temporarily prevented from adapting the filter coefficients. Processor 540 may then adjust the filter coefficients (e.g., as discussed below) to remove the lock-in DGD determined by processor 540 based on the framing information.

In some implementations, processor 540 may adjust the filter coefficients by applying a time shift to one or more filter coefficients. For the following examples, assume that taps, included in each equalizer component, are sampled at two samples per symbol. In a first example, if the lock-in DGD is 1U1, then processor 540 may shift the Hxx filter coefficient and the Hyx filter coefficient by two samples in a first direction. In a second example, if the lock-in DGD is 2U1, then processor 540 may shift the Hxx filter coefficient and the Hyx filter coefficient by two samples in the first direction, and processor 540 may shift the Hxy filter coefficient and the Hyy filter coefficient by two samples in the second direction. As a third example, if the lock-in DGD is 3UI, then processor 540 may shift the Hxx filter coefficient and the Hyx filter coefficient by four samples in the first direction, and processor 540 may shift the Hxy filter coefficient and the Hyy filter coefficient by two samples in the second direction. In this way, the lock-in DGD may be removed based on a time shift associated with the filter coefficients.

In some implementations, the taps included in the equalizer components may be fractionally sampled (e.g., rather than a sample equal to an integer as described above). In such implementations, processor 540 may adjust the filter coefficients based on an interpolation associated with the filter coefficients. For example, assume that the taps are sampled at $5/3$ samples per symbol such that spacing between the taps is $3/5$ of a time between bits (e.g., T), where T is equal to 1UI. In this example, if the lock-in DGD is determined to be 1UI, processor 540 may interpolate (e.g., using linear interpolation, using quadratic interpolation, etc.) an amount to shift the filter coefficients (e.g., since the filter coefficients can only be shifted in $3/5$ increments rather than integer increments).

Additionally, or alternatively, processor 540 may adjust the filter coefficients by an integer amount that minimizes an error associated with adjusting the filter coefficients. For example, assume that the taps are sampled at 5/3 samples per symbol such that spacing between the taps is $3/5$ of a time between bits (e.g., T), where T is equal to 1UI. In this example, if the lock-in DGD is 1UI, shifting the filter coefficients by 1 sample will result in an error of $-0.4$UI (e.g., $3/5-1=-0.4$), but shifting the filter coefficients by 2 samples will result in an error of $-0.2$UI (e.g., $3/5 \times 2 - 1 = 0.2$UI). As such, processor 540 may shift the filter coefficients by 2 samples (e.g., and CMA 510-7 may adapt the filter coefficients to remove the 0.2UI after the filter coefficient loop is closed).

Processor 540 may close the filter coefficient loop after adjusting the filter coefficients, and CMA component 510-7 may continue adapting the filter coefficients. After lock-in DGD is determined and removed, equalizer component 510, carrier recovery component 520, and decision component 550 may return to normal operation.

Decision component 550 may receive a signal (e.g., a phase-corrected x-pol signal and/or a phase-corrected y-pol signal provided by carrier recovery component 520), identify symbol values associated with the signal, and identify a string of bits corresponding to the symbols. In some implementations, decision component 550 may calculate an error value that corresponds to a likelihood that the string of bits is correctly identified. In some implementations, decision component 550 may provide output data corresponding to bits which may correspond to the data source received by Tx DSP 330.

While FIG. 5 shows Rx DSP 450 as including a particular quantity and arrangement of components, in some implementations, Rx DSP 450 may include additional components, fewer components, different components, or differently arranged components.

FIGS. 6A-6D are diagrams of an example implementation 600 relating to operations performed by components of the digital signal processor shown in FIG. 5. For the purposes of example implementation 600, assume that Tx DSP 310, included in an optical transmitter 212, has received a digital signal and determined an in-phase x-pol component of the digital signal, a quadrature x-pol component of the digital signal, an in-phase y-pol component of the digital signal, and a quadrature y-pol component of the digital signal. Further, assume that Tx DSP 310 includes a frame header insertion component.

Figure 6A:
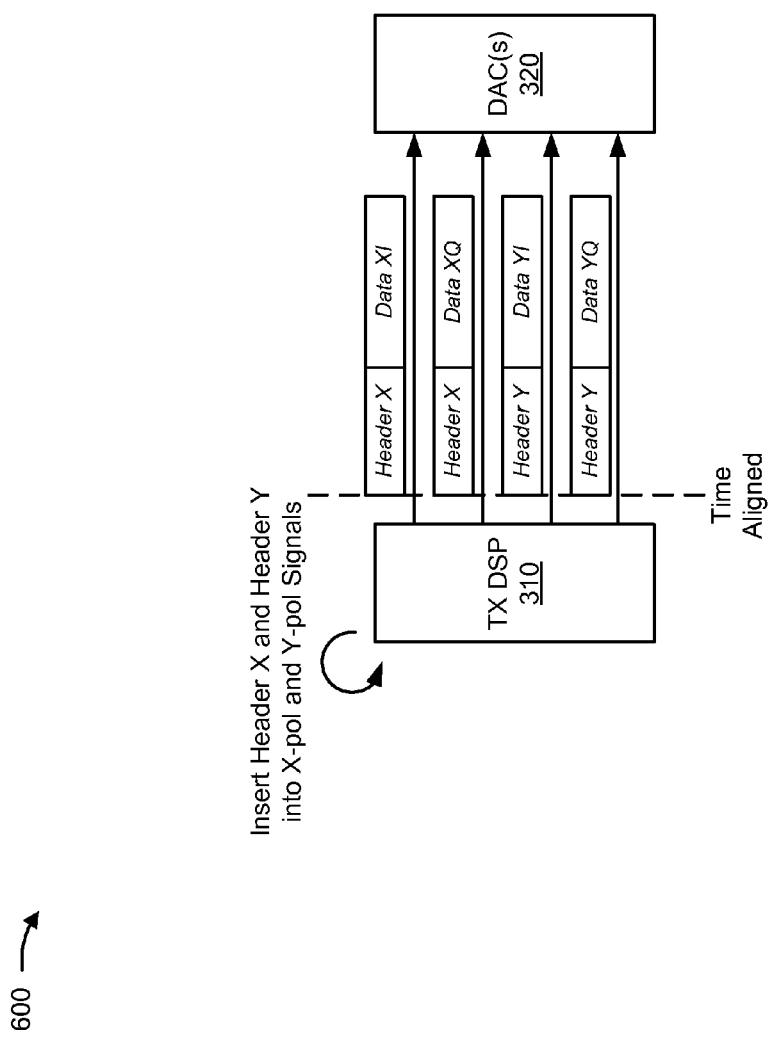
FIGS. 6A-6D are diagrams of an example implementation relating to operations performed by components of the digital signal processor shown in FIG. 5.

As shown in FIG. 6A, Tx DSP 310 (e.g., the frame header insertion component) may define a frame for grouped bits associated with the digital signal (e.g., a group of bits associated with the in-phase x-pol component, a group of bits associated with the quadrature x-pol component, a group of bits associated with the in-phase y-pol component, and a group of bits associated with the quadrature y-pol component). As shown, Tx DSP 310 and may insert a Header X frame header for frames of grouped bits associated with the x-pol components of the signal, and may insert a Header Y frame header for frames of grouped bits associated with the y-pol components of the signal. As shown, assume that Tx DSP 310 outputs digital signals having symbols that represent each component of the signal such that the Header X frame header and the Header Y frame header are time aligned in their respective data streams. For the purposes of example implementation 600, assume that the DACs 320, included in optical transmitter 212, operate in the usual manner and that an analog signal is eventually received by an optical receiver 253 included in the optical system.

Figure 6B:
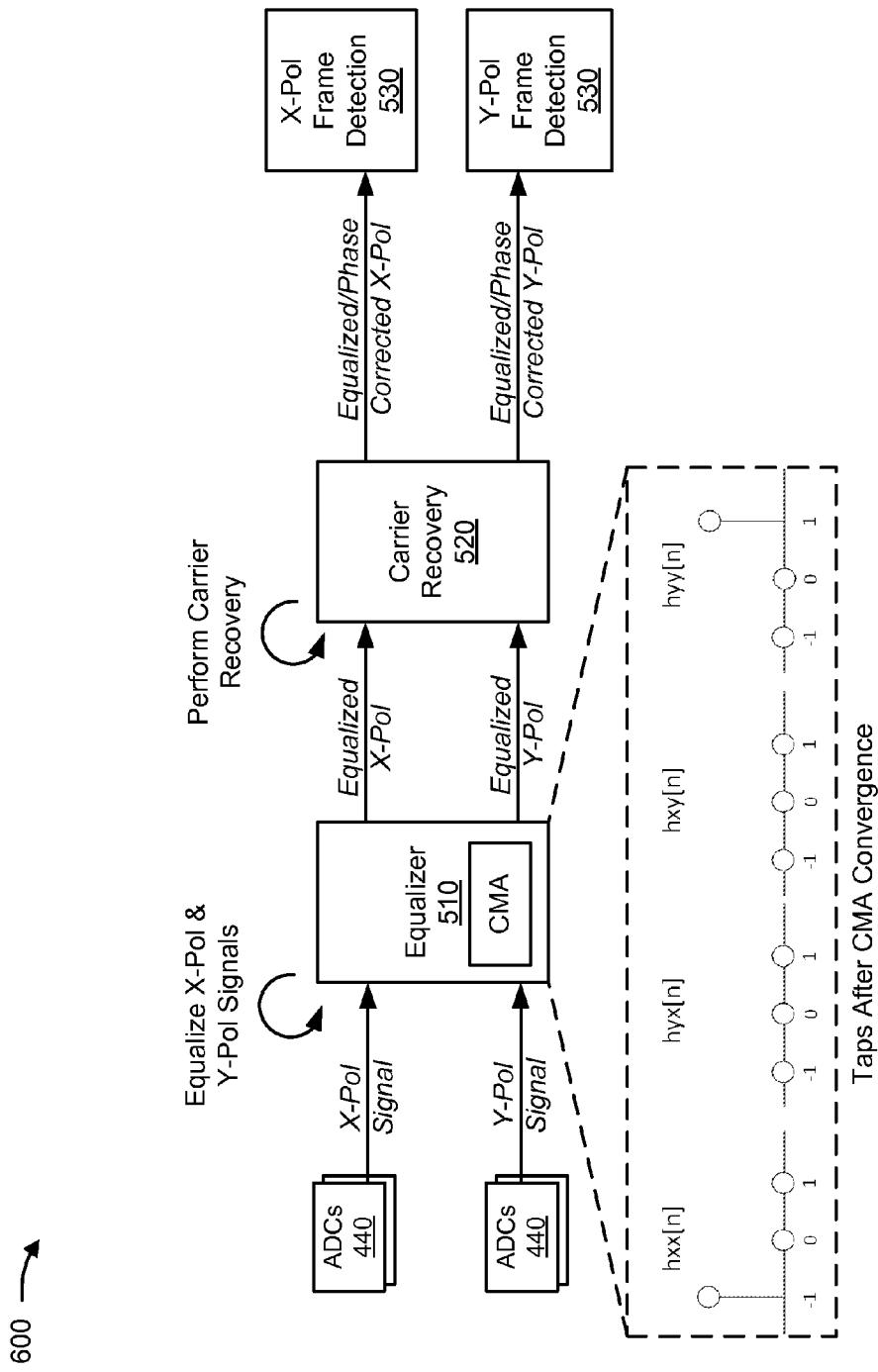

As shown in FIG. 6B, assume that optical receiver 253 receives the analog signal and proceeds in the usual manner such that ADCs 440 provide, to equalizer component 510, an x-pol signal (e.g., including an in-phase component and a quadrature component) and a y-pol signal (e.g., including an in-phase component and a quadrature component) that correspond to the signal provided by optical transmitter 212. For the purposes of example implementation 600, assume that the fiber channel via which the signal was received, is an ideal fiber channel with no PMD or ISI. As such, the PMD calculation, determined based on filter coefficients associated with optical receiver 253, should be equal to zero.

However, as shown, equalizer component 510 may equalize the x-pol signal and the y-pol signal (e.g., using a CMA component, an Hxx equalizer component, an Hyx equalizer component, an Hxy equalizer component, and an Hyy equalizer component) based on a blind equalization implemented using a CMA. As shown, assume that (e.g., after CMA convergence) a set of taps (e.g., spaced at 1 sample per symbol), associated with the filter coefficients, indicates that the equalized x-pol signal is advanced by 1 symbol, and that the y-pol signal is delayed by 1 symbol (e.g., such that the amount of PMD would be erroneously calculated as 2U1 based on the filter coefficients).

As further shown, equalizer component 510 may provide the equalized signal to carrier recovery component 520, and carrier recovery component 520 may perform phase correction on the equalized x-pol signal and the equalized y-pol signal. As shown, carrier recovery component 520 may provide the phase-corrected x-pol signal to an x-pol frame detection component 530 and may provide the phase-corrected y-pol signal to a y-pol frame detection component 530.

Figure 6C:
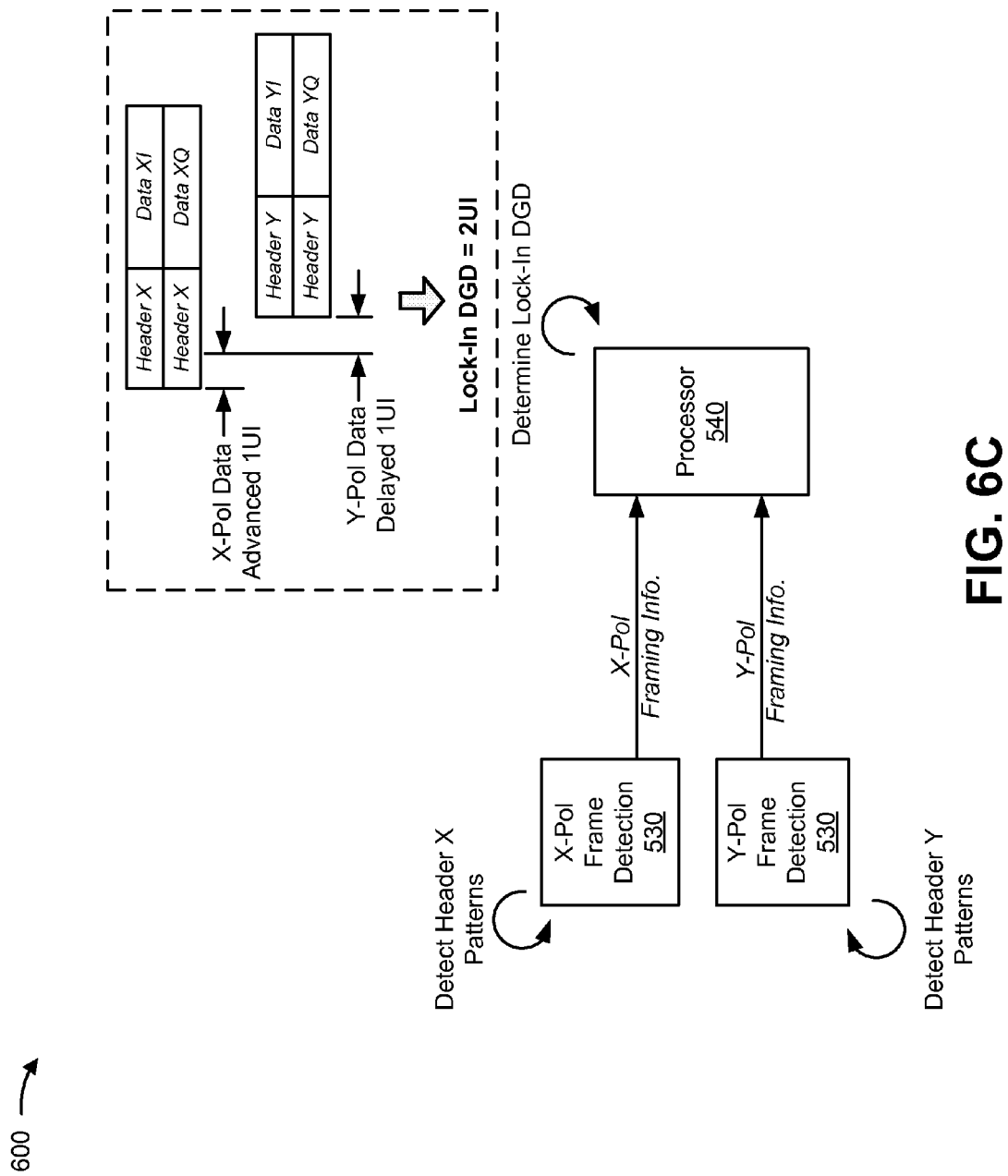

For the purposes of FIG. 6C, assume that x-pol frame detection component 530 and y-pol frame detection component 530 are configured to detect a Header X frame header pattern that includes the Header X frame header and a Header Y frame header pattern that includes the Header Y frame header, respectively (e.g., assume that the Header X frame header and the Header Y frame header are each known to x-pol frame detection component 530 and y-pol frame detection component 530). As shown in FIG. 6C, x-pol frame detection component 530 may detect a Header X frame header pattern based on detecting the Header X frame header in the phase-corrected x-pol signal. As also shown, y-pol frame detection component 530 may detect a Header Y frame header pattern based on detecting the Header Y frame header in the phase-corrected y-pol signal. As further shown, x-pol frame detection component 530 may provide, to processor 540, x-pol framing information associated with the Header X frame header pattern, and y-pol frame detection component 530 may provide, to processor 540, y-pol framing information associated with the Header Y frame header pattern.

As shown, processor 540 may determine based on the x-pol framing information and the y-pol framing information, that the phase-corrected x-pol signal has been advanced by one symbol, and may determine that the phase-corrected y-pol signal has been delayed by one symbol. As such, processor 540 may determine that there was 2UI of lock-in DGD (e.g., 1UI of lock-in DGD based on the advancement of the x-pol signal, and 1UI of lock-in DGD based on the delay of the y-pol signal) was introduced during the acquisition phase of the taps included in equalizer component 510.

Figure 6D:
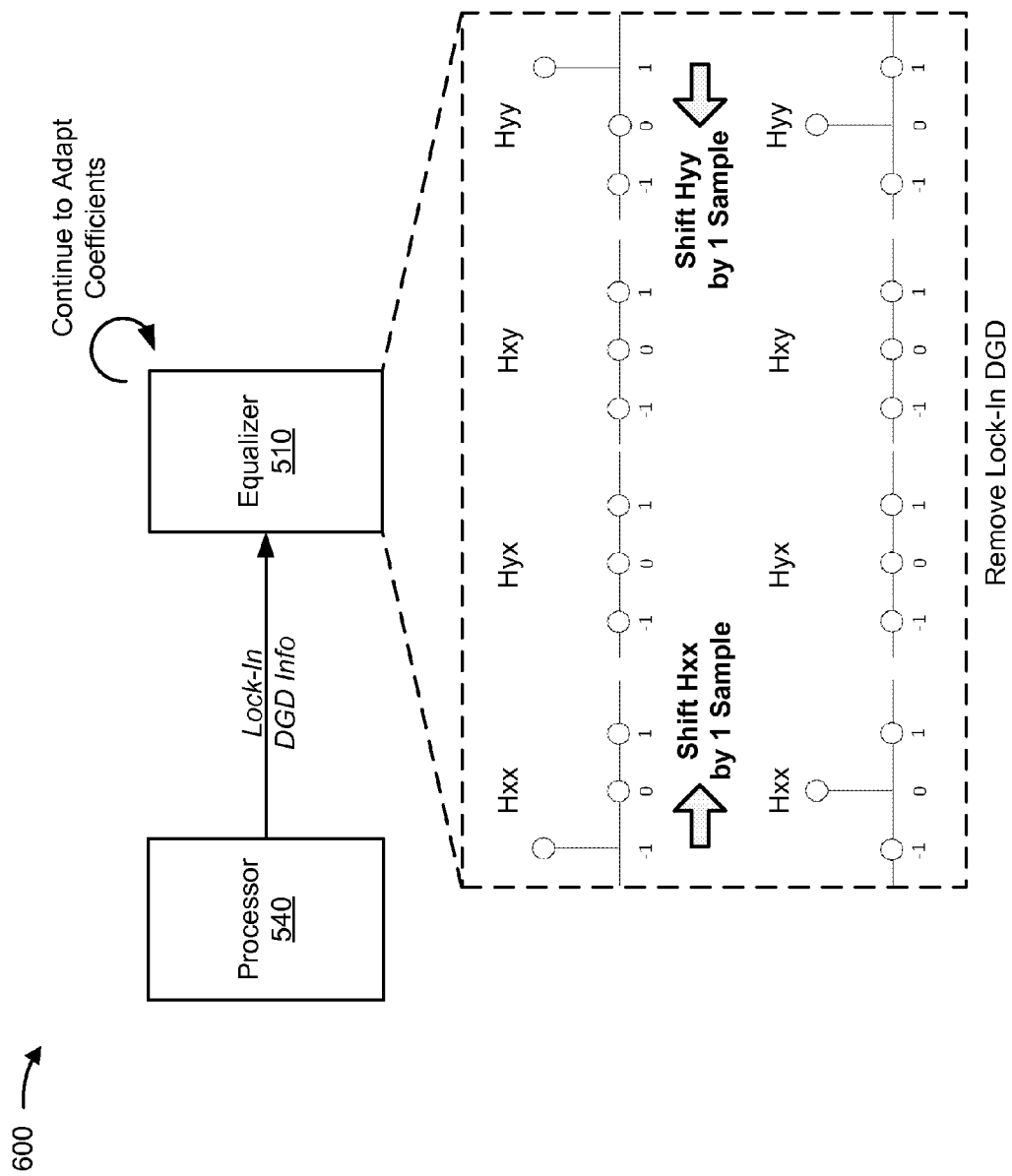

As shown in FIG. 6D, processor 540 may communicate with equalizer component 510 to open the filter coefficient loop, associated with the adapting the filter coefficients (e.g., the Hxx filter coefficient, the Hyx filter coefficient, the Hxy filter coefficient, and/or the Hyy filter coefficient), and processor 540 may adjust the filter coefficients (e.g., by shifting the Hxx filter coefficient one sample to the right and by shifting the Hyy filter coefficient by one sample to the left) to remove the 2UI of lock-in DGD. Processor 540 may then close the filter coefficient loop after adjusting the filter coefficients, and equalizer component 510 (e.g., the CMA) may continue adapting the filter coefficients in the usual manner. In this way, the lock-in DGD, associated with equalizer component 510, has been removed such that the amount of PMD may be accurately calculated based on the filter coefficients (e.g., since it is assumed that the fiber channel of example implementation 600 is ideal, the amount of PMD associated with the fiber channel would be correctly calculated as 0UI, rather than 2UI).

As indicated above, FIGS. 6A-6D are provided merely as an example. Other examples are possible and may differ from what was described with regard to FIGS. 6A-6D. While FIG. 6 was described with regard to adjusting the filter coefficients to remove the lock-in DGD, other implementations are possible. For example, rather than process 540 adjusting the filter coefficients to remove the lock-in DGD, a delay element may be included in Rx DSP 450 the x-pol data path and the y-pol data path (e.g., between equalizer component 510 and carrier recovery component 520) to account for the lock-in DGD.

Implementations described herein may allow an optical receiver to identify an amount and direction of lock-in DGD such that the optical receiver may use filter coefficients, associated with an equalizer that implements a CMA, to accurately determine fiber PMD.

The foregoing disclosure provides illustration and description, but is not intended to be exhaustive or to limit the implementations to the precise form disclosed. Modifications and variations are possible in light of the above disclosure or may be acquired from practice of the implementations. For example, while the processes and/or methods described herein are discussed primarily in terms of x-pol signals and y-pol signals, these processes and/or methods may be equally applied to other components of an optical signal.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical receiver comprising:
    a digital signal processor (DSP) configured to:
        receive a signal that has an x-polarization (x-pol) and a y-polarization (y-pol);
        equalize the x-pol of the signal, based on a constant-modulus-algorithm (CMA), to create an equalized x-pol signal,
            the x-pol of the signal being equalized using a set of filter coefficients determined using the CMA;
        equalize the y-pol of the signal, based on the CMA, to create an equalized y-pol signal,
            the y-pol of the signal being equalized using the set of filter coefficients determined using the CMA;
        perform phase correction on the equalized x-pol signal to create a phase-corrected x-pol signal;
        perform phase correction on the equalized y-pol signal to create a phase-corrected y-pol signal;
        identify a first frame header pattern within the phase-corrected x-pol signal,
            the first frame header pattern being based on a first frame header;
        identify a second frame header pattern within the phase-corrected y-pol signal,
            the second frame header pattern being based on a second frame header,
                the second frame header being different than the first frame header;
        determine, based on the first frame header pattern and the second frame header pattern, a quantity of lock-in differential group delay (DGD) between the phase-corrected x-pol signal and the phase-corrected y-pol signal; and
        adjust one or more filter coefficients, of the set of filter coefficients, based on the quantity of lock-in DGD,
            the one or more filter coefficients being adjusted to remove the quantity of lock-in DGD, and
            the one or more filter coefficients being adjusted to permit an amount of polarization mode dispersion to be correctly determined based on the set of filter coefficients.

2. The optical receiver of claim 1, where the DSP, when determining the quantity of DGD, is further configured to:
    determine a direction associated with the quantity of DGD; and
    where the DSP, when adjusting the one or more filter coefficients, is further configured to:
    adjust the one or more filter coefficients based on the direction associated with the quantity of DGD.

3. The optical receiver of claim 1, where the DSP, when adjusting the one or more filter coefficients, is further configured to:
    open a filter coefficient loop, associated with adapting the set of filter coefficients based on the CMA, to prevent the set of filter coefficients from being adapted; and
    close the filter coefficient loop after adjusting the one or more filter coefficients to permit the set of filter coefficients to be adapted.

4. The optical receiver of claim 1, where the DSP, when identifying the first frame header pattern, is further configured to:
    identify the first frame header pattern by detecting the first frame header in the phase-corrected x-pol signal,
        the first frame header having been inserted into an input x-pol signal by an optical transmitter associated with the optical receiver,
        the input x-pol signal corresponding to the phase-corrected x-pol signal.

5. The optical receiver of claim 1, where the DSP, when identifying the second frame header pattern, is further configured to:
    identify the second frame header pattern by detecting the second frame header in the phase-corrected y-pol signal,
        the second frame header having been inserted into an input y-pol signal by an optical transmitter associated with the optical receiver,
        the input y-pol signal corresponding to the phase-corrected y-pol signal.

6. The optical receiver of claim 1, where the DSP, when adjusting the one or more of filter coefficients, is further configured to:

adjust the one or more filter coefficients by applying a time shift to the one or more filter coefficients.

7. The optical receiver of claim 1, where the DSP, when adjusting the one or more of filter coefficients, is further configured to:
adjust the one or more filter coefficients by an integer amount that minimizes an error associated with adjusting the one or more filter coefficients.

8. A system comprising,
an optical receiver configured to:
receive a signal having a first component and a second component;
perform equalization of the first component of the signal to create a first equalized signal,
the equalization of the first component of the signal being based on a group of filter coefficients determined by a constant-modulus-algorithm (CMA);
perform equalization of the second component of the signal to create a second equalized signal,
the equalization of the second component the signal being based on the group of filter coefficients determined by the CMA;
perform phase correction of the first equalized signal to create a first phase-corrected signal;
perform phase correction of the second equalized signal to create a second phase-corrected signal;
detect a first frame header pattern within the first phase-corrected signal,
the first frame header pattern including a first frame header;
detect a second frame header pattern within the second phase-corrected signal,
the second frame header pattern including a second frame header;
compute, based on the first frame header pattern and the second frame header pattern, a quantity of lock-in differential group delay (DGD) between the first phase-corrected signal and the second phase-corrected signal; and
modify at least one filter coefficient, of the group of filter coefficients, based on the quantity of lock-in DGD,
the at least one filter coefficient being adjusted to remove the quantity of lock-in DGD, and
the at least one filter coefficient being modified to permit an amount of polarization mode dispersion to be accurately determined based on the group of filter coefficients.

9. The system of claim 8, where the optical receiver, when computing the quantity of DGD, is further configured to:
determine a direction associated with the quantity of DGD; and
where the optical receiver, when modifying the at least one filter coefficient, is further configured to:
modify the at least one filter coefficient based on the direction associated with the quantity of DGD.

10. The system of claim 8, where the optical receiver, when modifying the at least one filter coefficient, is further configured to:
open a filter coefficient loop, associated with adapting the group of filter coefficients based on the CMA, to prevent the group of filter coefficients from being adapted; and
close the filter coefficient loop after modifying the at least one filter coefficient to permit the group of filter coefficients to be adapted.

11. The system of claim 8, where the optical receiver, when detecting the first frame header pattern, is further configured to:
detect the first frame header pattern by identifying the first frame header in the first phase-corrected signal,
the first frame header having been inserted into a first input signal by an optical transmitter included in system,
the first input signal corresponding to the first phase-corrected signal.

12. The system of claim 8, where the optical receiver, when identifying the second frame header pattern, is further configured to:
detect the second frame header pattern by identifying the second frame header in the second phase-corrected signal,
the second frame header having been inserted into a second input signal by an optical transmitter included in the system,
the second input signal corresponding to the second phase-corrected signal.

13. The system of claim 8, where the optical receiver, when modifying the at least one filter coefficient, is further configured to:
modify the at least one filter coefficient by applying a time shift to the at least one filter coefficient.

14. The system of claim 8, where the optical receiver, when modifying the at least one filter coefficient, is further configured to:
modify the at least one filter coefficient based on an interpolation associated with the at least one filter coefficient.

15. A method, comprising:
receiving, by a digital signal processor (DSP), a signal having a first component and a second component;
equalizing, by the DSP, the first component of the signal to create a first equalized signal,
the first component of the signal being equalized based on a first group of filter coefficients determined using a constant-modulus-algorithm (CMA);
equalizing, by the DSP, the second component of the signal to create a second equalized signal,
the second component of the signal being equalized based on a second group of filter coefficients determined using the CMA;
performing, by the DSP, phase correction of the first equalized signal to create a first phase-corrected signal;
performing, by the DSP, phase correction of the second equalized signal to create a second phase-corrected signal;
identifying, by the DSP, a first header timing pattern included in the first phase-corrected signal,
the first header timing pattern being based on a first frame header;
identifying, by the DSP, a second header timing pattern included in the second phase-corrected signal,
the second header timing pattern being based on a second frame header,
the second frame header being different than the first frame header;
determining, by the DSP, information associated with lock-in differential group delay (DGD) between the first phase-corrected signal and the second phase-corrected signal,
the information associated with the lock-in DGD being determined based on the first frame header pattern relative to the second frame header pattern, and
the information associated with the lock-in DGD including a quantity of lock-in DGD and a direction associated with the lock-in DGD; and adjusting, by the DSP, at least one filter coefficient based on the information associated with the lock-in DGD,
the at least one filter coefficient being included in the first group of filter coefficients or the second group of filter coefficients.

16. The method of claim 15, where adjusting the at least one filter coefficient further comprises:
opening a filter coefficient loop, associated with adapting the first group of filter coefficients and the second group of filter coefficients, to prevent the first group of filter coefficients and the second group of filter coefficients from being adapted; and
closing the filter coefficient loop after adjusting the at least one filter coefficient to allow the first group of filter coefficients and the second group of filter coefficients to be adapted.

17. The method of claim 15, where identifying the first frame header pattern further comprises:
identifying the first frame header pattern by detecting the first frame header in the first phase-corrected signal,
the first frame header having been inserted into a first input signal by an optical transmitter associated with the DSP,
the first input signal corresponding to the first phase-corrected signal.

18. The method of claim 15, where identifying the second frame header pattern further comprises:
identifying the second frame header pattern by detecting the second frame header in the second phase-corrected signal,
the second frame header having been inserted into a second input signal by an optical transmitter associated with the DSP,
the second input signal corresponding to the second phase-corrected signal.

19. The method of claim 15, where adjusting the at least one filter coefficient further comprises:
adjusting the at least one filter coefficient by applying a time shift to the at least one filter coefficient.

20. The method of claim 15, where adjusting the at least one filter coefficient further comprises:
adjusting the at least one filter coefficient by an integer amount that minimizes an error associated with adjusting the at least one filter coefficient.

* * * * *